United States Patent [19]
Johnson et al.

[11] Patent Number: 5,107,494
[45] Date of Patent: Apr. 21, 1992

[54] METHOD AND APPARATUS FOR COMMUNICATING AN INFORMATION SIGNAL HAVING DYNAMICALLY VARYING QUALITY

[75] Inventors: Brian K. A. Johnson; Stelios J. Patsiokas, both of Plantation, Fla.

[73] Assignee: Motorola, Inc., Schaumburg, Ill.

[21] Appl. No.: 617,291

[22] Filed: Nov. 16, 1990

Related U.S. Application Data

[63] Continuation of Ser. No. 341,339, Apr. 20, 1989, abandoned.

[51] Int. Cl.⁵ .................... H04J 3/16; H01Q 11/12; H04B 1/04
[52] U.S. Cl. ................... 370/95.1; 455/116; 455/58.2; 370/119; 340/825.5
[58] Field of Search ............ 370/29, 79, 80, 83, 370/95.1, 109, 118, 119; 379/6, 13, 24, 57, 58, 59, 60, 61, 62, 63, 168, 184, 192, 194, 207; 375/122; 455/1, 43, 50, 63, 67, 68, 69, 70, 115, 116, 136, 138, 58, 140, 181, 194, 212, 218, 219, 222, 231, 232, 234, 239, 240, 246, 268, 278; 340/825.5, 825.51; 358/349

[56] References Cited

U.S. PATENT DOCUMENTS

| | | | |
|---|---|---|---|
| 4,034,297 | 7/1977 | Giorgi et al. | 455/116 |
| 4,242,753 | 12/1980 | Dolikian et al. | 455/116 |
| 4,335,468 | 6/1982 | Foster et al. | 455/58 |
| 4,434,505 | 2/1984 | Gutleber | 455/63 |
| 4,551,854 | 11/1985 | Rutty et al. | 455/58 |
| 4,754,450 | 6/1988 | Lynk, Jr. et al. | 370/29 |
| 4,794,620 | 12/1988 | Moore et al. | 455/58 |
| 4,811,376 | 3/1989 | Davis et al. | 379/57 |
| 4,837,786 | 6/1989 | Gurantz et al. | 370/20 |

Primary Examiner—Douglas W. Olms
Assistant Examiner—Wellington Chin
Attorney, Agent, or Firm—Michael J. Buchenhorner; Thomas G. Berry

[57] ABSTRACT

Subscribers participating in a call may communicate information un-impeded until the occurrence of an event (such as the expiration of a time interval). After detecting this event, the quality or intelligibility of the communicated information is repeatedly reduced to encourage the subscribers to voluntarily conclude the call.

23 Claims, 4 Drawing Sheets

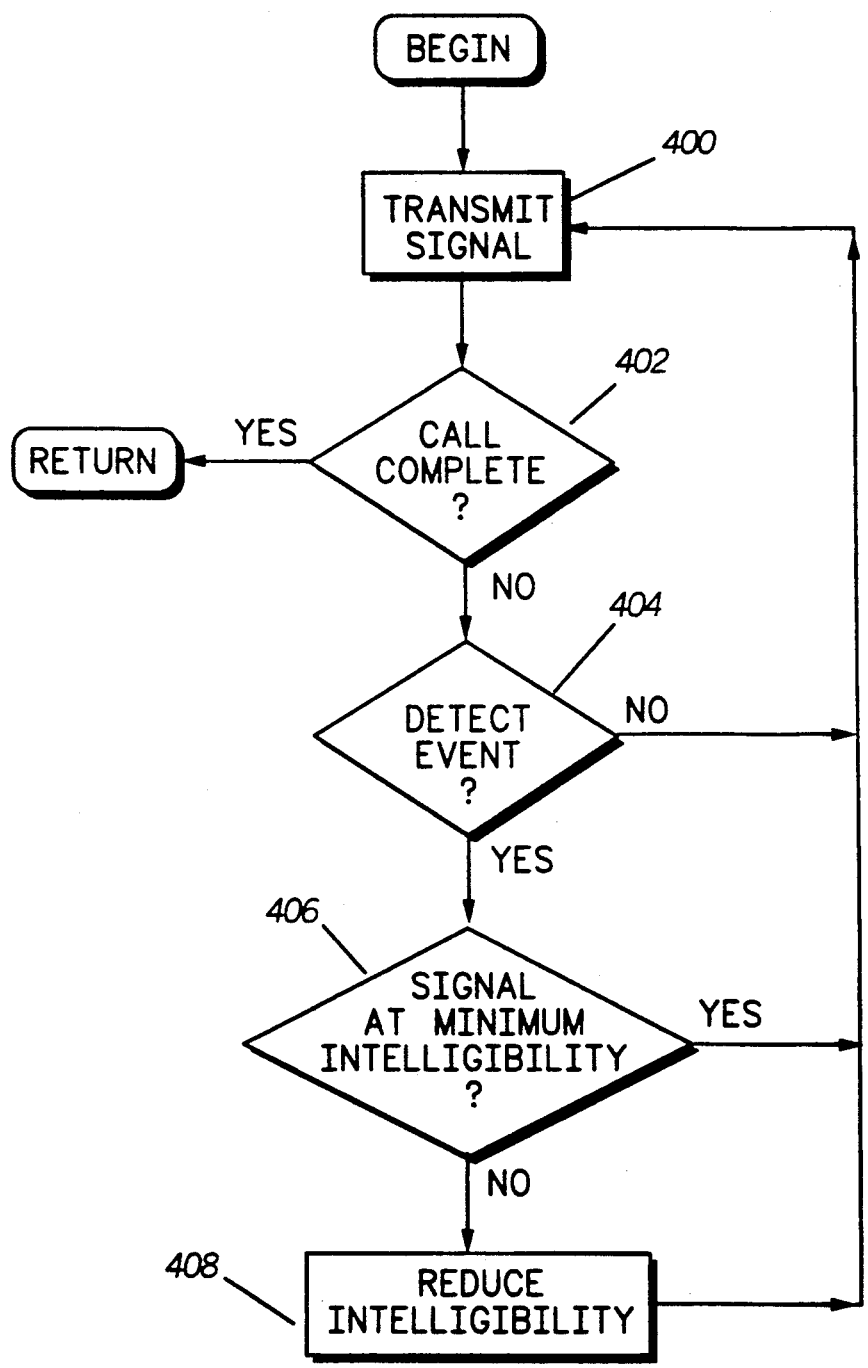

METHOD AND APPARATUS FOR COMMUNICATING AN INFORMATION SIGNAL HAVING DYNAMICALLY VARYING QUALITY

This is a continuation of application Ser. No. 07/341,339 filed Apr. 20, 1989 and now abandoned.

TECHNICAL FIELD

This invention relates generally to radio frequency (RF) communication systems, and more specifically to those RF communication systems that control the time period that subscribers are permitted to use communication resources, and is particularly directed towards encouraging subscribers to quickly conclude a communication so as to effectively utilize an RF communication system.

BACKGROUND ART

Contemporary radio frequency (RF) communication systems typically allocate communication resources (channels or time slots) among several subscriber units. Generally, each subscriber desiring access to the communication system must transmit a call request code and receive a grant code before communication (transmissions) between two or more subscriber units may commence.

Since the communication resources of RF communication systems are limited, it is known to limit the duration of any single communication to a predetermined time interval. Should the subscribers participating in a call attempt to communicate beyond this time interval, a warning tone precedes automatic preemption of the communication, and the communication resource is reassigned to other subscribers. While designed to improve the capacity of a communication system, this practice tends to confuse and frustrate subscribers as calls are abruptly terminated. Moreover, such a ruthless call preemption scheme impedes effective communication, and may actually reduce the efficiency of the communication system, since, in practice, subscribers tend to immediately re-request access to the communication system to complete their call. This causes an increase in signalling traffic that may reduce the efficiency of the communication system below that of merely allowing the subscribers to complete the original call. Accordingly, a need exists for a method of encouraging subscribers to quickly conclude their communications, without hampering the capacity and efficiency of the communication system.

SUMMARY OF THE INVENTION

Accordingly, it is an object of the present invention to provide a communication system that avoids the detriments of the prior art.

Briefly, according to the invention, subscribers participating in a call may communicate information unimpeded until the occurrence of an event (such as the expiration of a time interval) is detected. After detecting this event, the quality or intelligibility of the communicated information is repeatedly reduced to encourage the subscribers to voluntarily conclude the call.

BRIEF DESCRIPTION OF THE DRAWINGS

FIG. 4 is a flow diagram illustrating the steps used by a communication system to effect the present invention.

DETAILED DESCRIPTION OF THE PREFERRED EMBODIMENT

Figure 1:
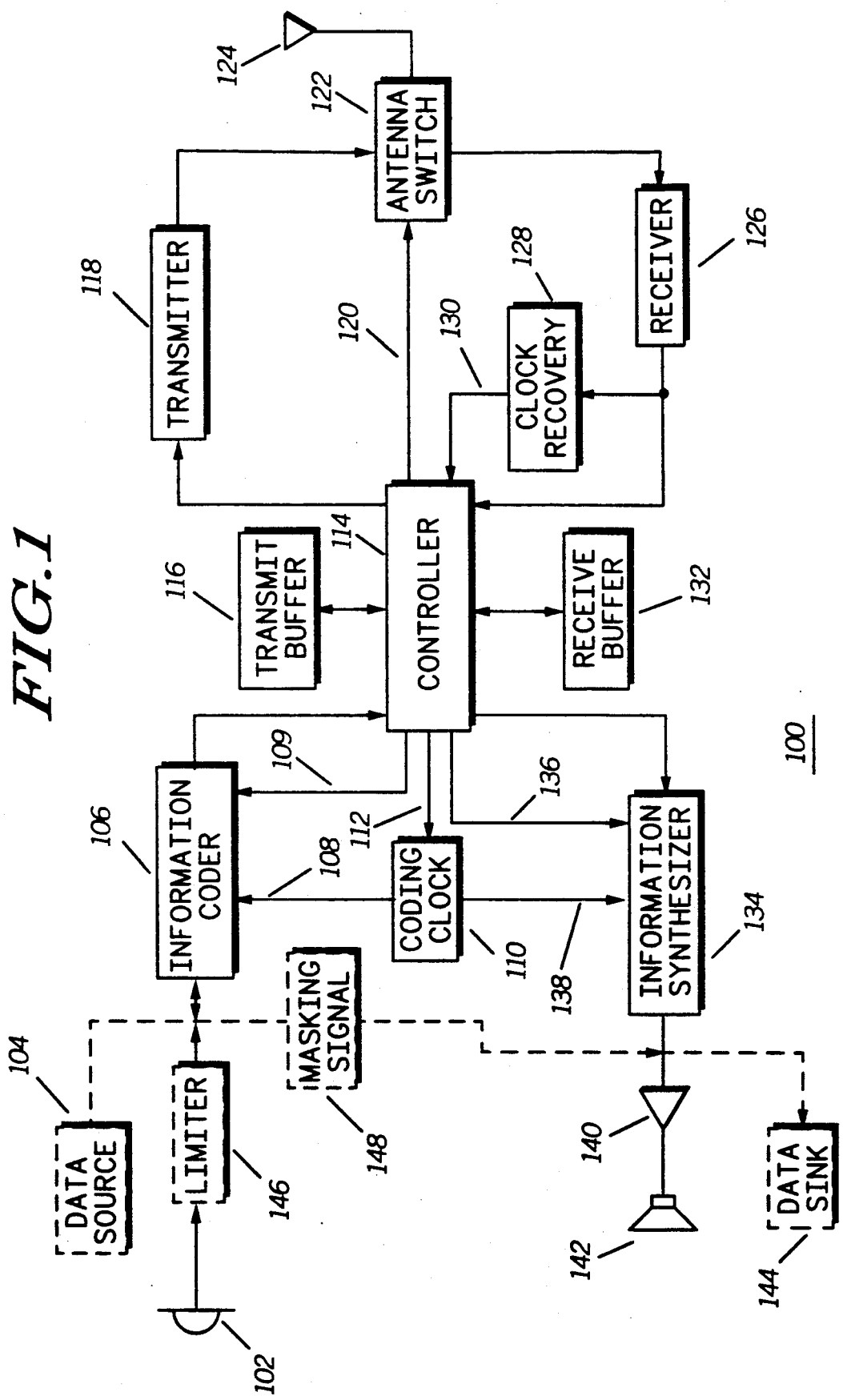
FIG. 1 is a block diagram of a time division multiplex subscriber unit in accordance with the invention.

Referring to FIG. 1, a block diagram of a time division multiplex (TDM) subscriber unit 100 is shown in accordance with the present invention. The subscriber unit 100 may comprise a mobile, portable, or control station, which communicates information (voice or data) via one or more TDM time slots arranged on one or more radio frequency channels. As used herein, a portable unit is a communication device designed to be carried on or about the person, a mobile subscriber unit is typically designed to be installed in vehicles, and a control station comprises a subscriber unit designed to be permanently or semi-permanently installed in a building or other fixed location.

Operationally, the subscriber unit 100 processes information signals (voice information from the microphone 102, or data information from the data source 104) in an information code 106. The information coder 106 preferably comprises a digital signal processor (DSP), which processes the information signal at a coding rate defined by a coding signal 108, which is provided by a clock source 110. According to the invention, the clock source 110 is programmable (112) by a controller 114 so as to vary the coding rate of the information coder 106. Additionally, the coding procedure(s) executed by the information coder 106 may be adapted by programming line(s) 109 by the controller 114. By adapting the coding rate (108) and the coding procedures (109), the information coder 106 may affect a plurality of different coding schemes such as subband coding (SBC), linear predictive coding (LPC), or other coding procedures known in the art.

The coded information signals are received by the controller 114, and stored in a transmit buffer 116 at the coding rate. After accumulating a suitable amount of information in the transmit buffer, the controller 114 extracts and formats a packet of information, which is routed to the transmitter 118 for transmission at a suitable channel rate so as to time division multiplex the coded information signals of several subscriber units. Next, the controller 114 activates (120) an antenna switch 122 so as to couple the transmitter 118 to an antenna 124 so that the packet of information may be transmitted at an appropriate time so as to occupy one or more time slot(s) assigned to subscriber unit 100 to enable communication.

To receive information, the antenna switch 122 is activated (120) to couple the antenna 124 to a receiver 126. The receiver 126 provides baseband (recovered) coded information signals to a clock recovery circuit 128 and the controller 114. The clock recovery circuit provides a recovered clock signal 130 that is used by the controller 114 to synchronously receive the recovered coded information signals. The controller 114 stores the received information in a receive buffer 132 at the channel rate, and retrieves this information from the receive buffer 132 at the rate the information was coded. To recover (decode) the information signals, the controller 114 routes the stored information to an information synthesizer 134 that restores the encoded information to an intelligible form. To do this, the information synthesizer 134 must be programmed (136) by the controller 114 so as to synthesize the information using a complementary coding function that was used by the information coded at the transmitting subscriber unit. That is, both the coding procedures (type) (i.e., LPC or SBC) and the encoding rate (for example, 9.6 kbs, 4.8 kbs, or 2.4 kbs) must be identical at the receiving and transmitting subscriber units. After being programmed by the controller 114, the information synthesizer 134 operates to produce an information signal that is suitable for presentation to the subscriber. For voice information, the synthesized signals are routed to an audio amplifier 140 and a speaker 142. Conversely, recovered data information is provided to a data sink (such as a printer or a display) for presentation to the subscriber.

According to the invention, subscriber units may communicate unimpeded until an event is detected (for example, the expiration of a predetermined time interval). After detecting this event, the controller 114 operates to reduce the coding signal (108) so as to intentionally degrade the quality and/or intelligibility of the information signal. Additionally, the coding procedures (type) may be altered such as by adapting from 9.6 kbs SBC to 2.4 kbs LPC, which would reduce the intelligibility (or quality) of the message. In this way, the subscribers are encouraged to terminate the communication as the transmitted information signals gradually become more difficult to understand. Thus, abrupt automatic termination of calls is avoided in favor of a gradual quality degradation, which encourages the subscribers to voluntarily wind up the communication. Accordingly, communication resources become available for use by other subscribers, while the existing practice of re-requesting access to the communication resources is reduced since subscribers will tend to complete their message, albeit at reduced intelligibility (or quality), rather than re-dial to access the system. Optionally, certain subscribers (executives or other high-level officials) may operate within the communication system without having their communications impededed in any way (i.e., without intelligibility or quality reduction). Such subscribers are contemplated as being permitted to communicate indefinitely, and therefore, are encouraged to terminate their communications.

In the preferred embodiment of the present invention, the event detected to trigger intelligibility (or quality) reduction comprises the expiration of a predetermined time interval. According to the invention, the subscribers may communicate unimpeded (i.e., a full quality information signal) for this time interval, which is determined by the controller 114 using any suitable software or algorithm that determines when a time period has lapsed. Of course, other events may be used singularly or in conjunction with a time interval to trigger intelligibility (or quality) reduction. For example, the controller 114 may detect the beginning of a busy period (determined either by real-time or by measuring the communication traffic), or the accumulated time that each subscriber requests access to the communication resources may be detected. Thus, the preferred communication system can trigger both the reduction of the unimpeded communication interval and the rate of which intelligibility (or quality) is reduced so as to more quickly discourage prolonged communication by the subscribers.

Referring still to FIG. 1, it was previously mentioned that the preferred intelligibility (or quality) degradation comprises a reduction in the coding rate and/or a variation in the coding procedures (type). Alternately, the intelligibility (or quality) of the information signal can be degraded in a number of other ways. For example, a limiter 146 could be disposed between the microphone 102 and the information coder 106 so as to increase distortion components in a voice signal. This may be accomplished by amplifying or hard limiting the information signal so as to intentionally clip the signal. As is known, clipped (or squared off) signals contain a high degree of distortion components. Therefore, one method of reducing the intelligibility (or quality) of the signal is to increase the distortion components of the information signal to be transmitted. Also, the audio bandwidth of the information signal could be reduced (such as by filtering or discarding bits in the information coder) to reduce the intelligibility (or quality) of the information signal. Additionally, a masking signal could be injected at the input of the information coder 106 from a masking signal source 148. The masking signal may merely be a noise signal, which would increase noise floor of the received signal, or it could be an audio tone (or other suitable signal) that combines with the information signal so as to reduce the quality and/or intelligibility of the information signal at the receiving end. Moreover, the masking signal could be supplied at the receiving end by combining the noise or audio signals at the output of the information synthesizer 134. Any of these techniques would reduce the intelligibility (or quality) of the information signals. Accordingly, as a general statement, any process that reduces the quality or the intelligibility of the information signal is effective for use with the present invention to encourage subscribers to relinquish the communication resource for use by other subscribers.

The intelligibility (or quality) reduction used by the present invention to encourage voluntary communication resource relinquishment, is preferably performed in steps so as to effect declining intelligibility (or quality) over time or in response to detection of a variety of events. Depending upon the implementation, the intelligibility (or quality) could be reduced to zero (at which point the communication resources would be reclaimed), or alternately, the communication resource may be reduced to some minimum level of intelligibility (or quality), at which the point the subscriber's communication may continue indefinitely. For example, the present invention may permit unimpeded communication for a three minute time interval, after which the information coding rate is adapted from 9.6 kbs SBC to 4.8 kbs SBC. After another time interval (perhaps one minute) the information coding scheme by change to 4.8 kbs LPC, thus degrading intelligibility (or quality) one step further. After another time interval (for example, one minute which may be reduced to thirty seconds during busy hour) the coding scheme is again adapted to 2.4 kbs LPC, which establishes a floor intelligibility (or quality) rate. At this point, the information signal would be intelligible, but may sound hollow and mechanical. Nevertheless, if the subscribers desire to continue to communicate at this level of intelligibility (or quality), they are permitted to do so.

Referring to FIG. 2, the present invention prefers to reclaim portions of time slots that are not used (within frames) during the time when the intelligibility (or quality) is reduced. Those skilled in the art will appreciate that a reduced quality information signal (i.e., coded at a lower rate) will take less time to transmit. Accordingly, the invention preferably operates to reallocate the time slot for use by other subscribers, or for use by the communication system to transmit signalling or control information to maintain the efficient operation of the communication system.

Figure 2B:
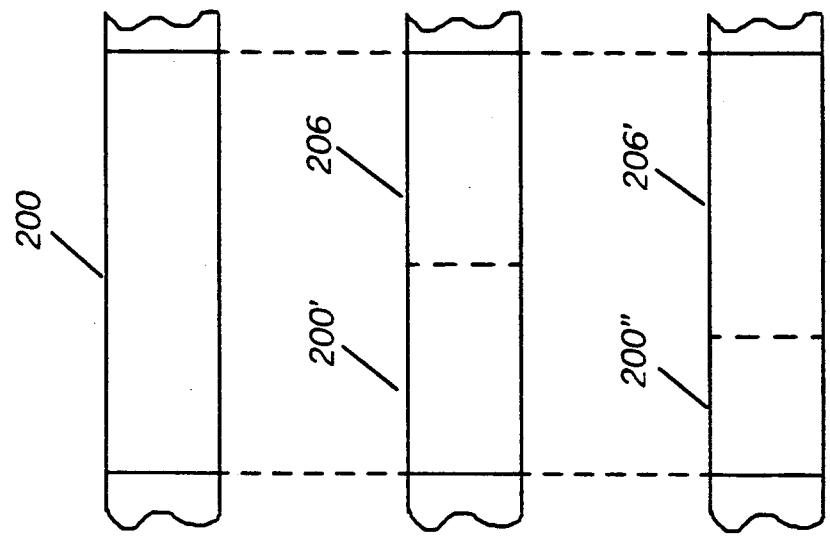
FIGS. 2a and 2b are illustrations of a time division multiplex communication channel highlighting an improvement in communication resource capacity in accordance with the invention.
Figure 2A:
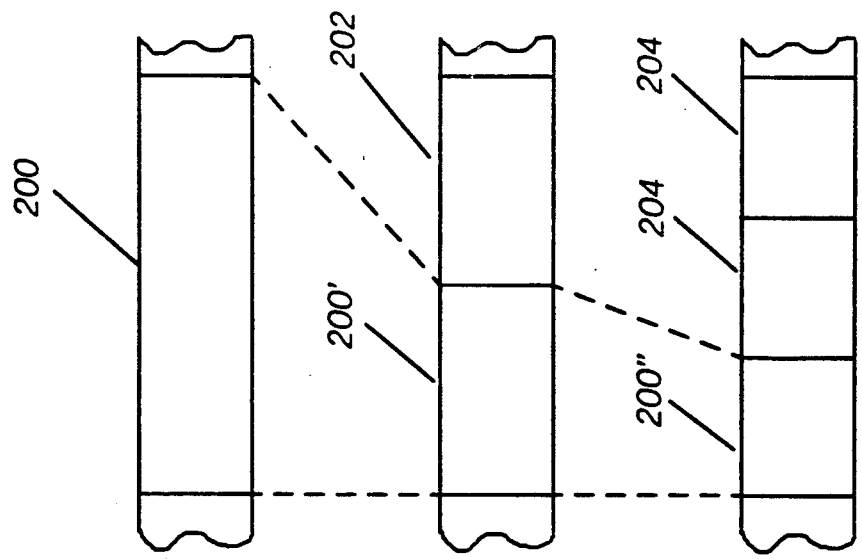

FIG. 2a illustrates a time slot 200 suitable for carrying toll grade voice during the time interval that communication is permitted at full intelligibility (or quality). After a time interval, the coding scheme is adapted to reduce the intelligibility (or quality) of the information signal, and the controller 114 reformats the reduced information packet into a time slot 200'. According to the invention, the remainder or the original time slot 200 may be reformatted into a sub-slot 202, that may be used by another subscriber unit operating in a reduced intelligibility (or quality) mode. Thus, capacity is increased, and the grade of service of the communication system is improved. Thereafter, the coding scheme may be again adapted to reduce the information to reside in a time slot 200", which allows sub-slots 204 to accommodate two other subscribers operating in a minimum intelligibility (or quality) mode.

Alternately, FIG. 2b illustrates the time slot 200 being reformatted into the sub-slot 200' thereby defining a portion 206 that may be used for signalling or control information. As the information signal is further reduced in intelligibility (or quality), it may reside in the time slot 200". Thus, more signalling and control information may be placed in the portion 206'. In this way, the communication system may improve its efficiency by effective placement of signalling and control information. This practice will expand capacity by apportioning and subdividing time slots into sub-slots to accommodate additional users at reduced intelligibility (or quality) rates (for example, during busy hour or as otherwise needed).

Figure 3:
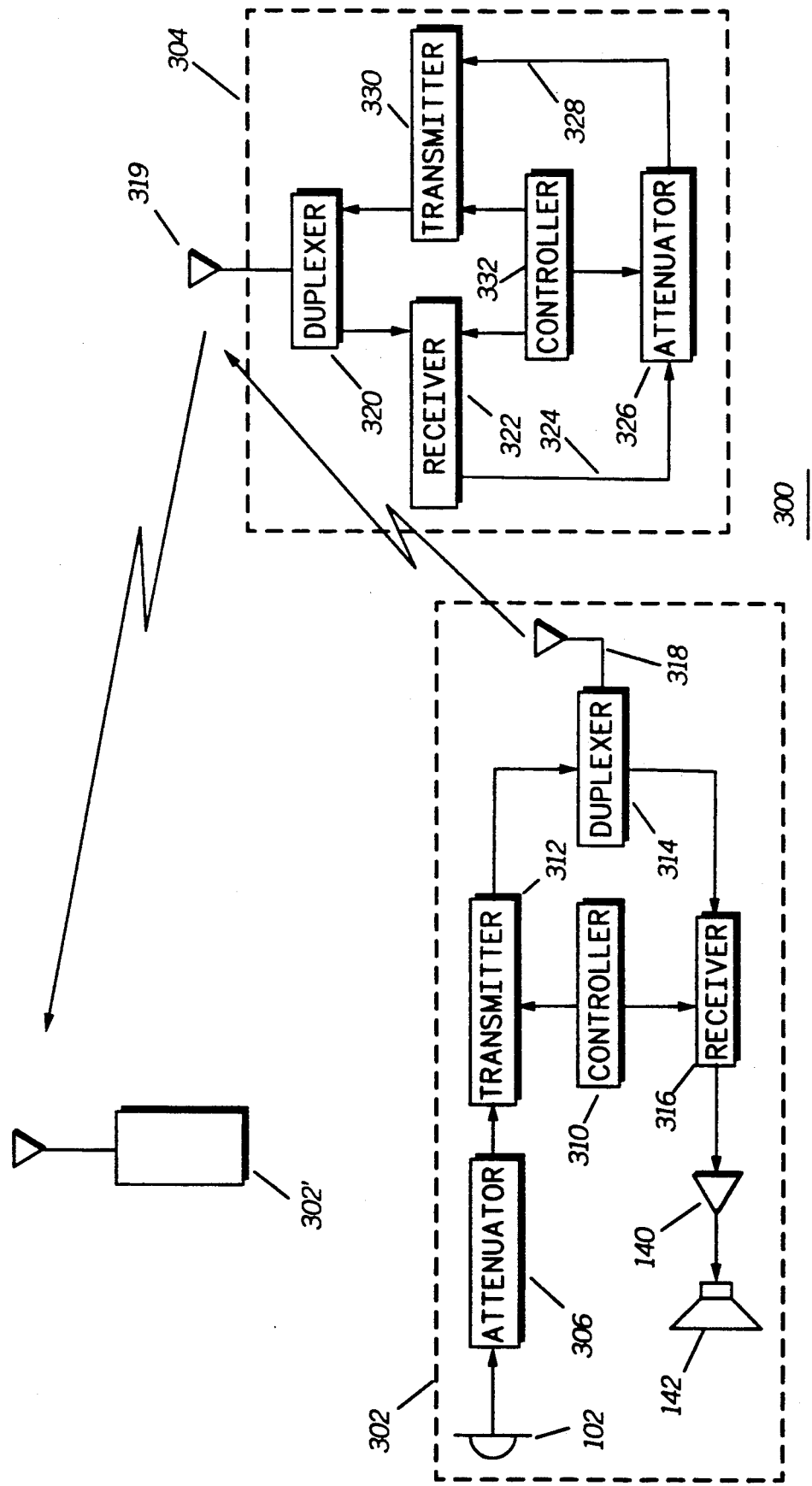
FIG. 3 is a block diagram of a frequency division multiplex communication system in accordance with the invention.

Referring to FIG. 3, a block diagram of a frequency division multiplex (FDM) communication system 300 is shown in accordance with the present invention. In the communication 300, a subscriber 302 communicates with another subscriber unit 302' via a repeater 304. To accomplish this, an information signal provided by the microphone 102 is routed to an attenuator 306, which is programmed (308) by a controller 310. The attenuated information signal is routed to a transmitter 312, which passes the information signal through a duplexer 314 to an antenna 318. Received information comes from the antenna 318 (via the duplexer 314) to a receiver 316, which routes the recovered information signals to an amplifier 140 for presentation to the operator via the speaker 142.

Assuming that the subscriber units 302 and 302' are operating at a distance that prohibits direct communication, it is known to use repeater unit 304 to increase the effective communitcation range of each individual subscriber unit. Accordingly, a repeater 304 receives the signal transmitted by the subscriber 302 via its antenna 319. This received information is routed via a duplexer 320 to a receiver 322 that provides a recovered signal 324 to an attenuator 326. The attenuator 326 is controlled by the controller 332 to provide an attenuated signal 328 to a transmitter 330. The transmitter 330 transmits (repeats) the signal (via the duplexer 320 and the antenna 319) to the subscriber unit 302.

According to the invention, the information signal may have its quality and intelligibility (or quality) reduced by the controller 310 and the attenuator 306 by progressively increasing the attenuation of the information signal. Therefore, the subscribers are permitted to communicate at full intelligibility (or quality) (i.e., zero attenuation) for a certain time interval, after which the attenuation is gradually increased to reduce the intelligibility (or quality) of the information signal. This encourages the subscribers to terminate the call and relinquish the communication resource so that other subscriber units may have access to it.

As can be seen with reference to FIG. 3, the intelligibility (or quality) reduction may be accomplished either at the subscriber unit 302 (via the attenuator 306) or at the repeater 304 (via the attenuator 326). That is, the intelligibility (or quality) reduction can be either (or both) centralized or decentralized in accordance with the desires of the particular embodiment of a communication system. In this way, the intelligibility (or quality) of the information signals can be reduced (by increasing the attenuation) to zero or to some threshold level of intelligibility (or quality) to encourage the subscribers to terminate the call.

Referring to FIG. 4, a flow diagram illustrating the steps executed by the present invention are shown. The routine begins in step 400, where the information signal is transmitted. During the transmission, the controller is continually checking to determine whether the call has been completed. If so, decision 402 returns control to other routines or processes used to control the subscriber unit. However, if the determination of decision 402 is that the call is not yet complete, the routine proceeds to decision 404, which determines whether the event to trigger intelligibility (or quality) reduction has been detected. As previously mentioned, the detection of this event may be the expiration of a time interval, the detection of a busy period, or the detection of an information capacity level above a predetermined threshold. In any case, when this event is detected, the routine proceeds to decision 406, which determines whether the information signal is being coded at a minimum level of intelligibility (or quality). If so, the routine returns to step 400, where the information signal continues to be transmitted. However, if the determination of decision 406 is that the information signal has not yet reached its minimum level of intelligibility (or quality), the routing proceeds to step 408, where the intelligibility (or quality) is reduced by variation of the coding rate or coding procedures (type), or by other methods, such as increasing the distortion components of the information signal, adding a masking signal to the information signal, or attenuating the information signal to reduce its intelligibility (or quality). Following this, the routine returns to step 400, where the transmission continues, albeit, with the reduced intelligibility (or quality) signal.

The entire process of FIG. 4, continues in a loop until the call is completed and decision 402 returns control to other processes. At each pass through the loop, the event detection performed by decision 404 may change so as to quicken the rate that information intelligibility (or quality) is reduced. That is, the time intervals at which intelligibility (or quality) is reduced may be shortened, or the rate at which intelligibility (or quality) is reduced may be increased by factors such as system loading, emergency traffic, or the amount of time that this particular subscriber unit has occupied the system.

In summary, the present invention operates to gradually reduce the intelligibility (or quality) of an information signal so as to encourage subscribers to voluntarily terminate their communications and relinquish communication resources for the benefit of other subscribers. By reducing intelligibility (or quality) to a minimum intelligibility (or quality) threshold, the present invention avoids abrupt preemption of communication to ease the frustration and confusion experienced by subscribers operating in other communication systems.

What is claimed is:

1. In a communication system comprising at least two subscriber units, a method for communicating an information signal between the subscriber units, comprising the step of:
   (a) allowing unimpeded communication for a time interval between the subscriber units; and
   (b) gradually reducing intelligibility or quality of the information signal communicated between the subscriber units during communication and after the time interval.

2. The method of claim 1, wherein step (b) comprises gradually adding noise to the information signal to reduce said intelligibility or quality of the information signal communicated between the subscriber units after the time interval.

3. The method of claim 1, wherein step (b) comprises gradually reducing an information coding rate for the information signal to reduce said intelligibility or quality of the information signal communicated between the subscriber units after the time interval.

4. The method of claim 1, wherein step (b) comprises gradually changing an encoding scheme for the information signal to reduce said intelligibility or quality of the information signal communicated between the subscriber units after the time interval.

5. The method of claim 1, wherein step (b) comprises gradually increasing distortion of the information signal to reduce said intelligibility or quality of the information signal communicated between the subscriber units after the time interval.

6. The method of claim 1, wherein step (b) comprises gradually attenuating the information signal to reduce said intelligibility or quality of the information signal communicated between the subscriber units after the time interval.

7. The method of claim 1, wherein step (b) comprises gradually adding a masking signal to the information signal to reduce said intelligibility or quality of the information signal communicated between the subscriber units after the time interval.

8. The method of claim 1, wherein step (b) comprises gradually reducing the information signal's bandwidth to reduce said intelligibility or quality of the information signal communicated between the subscriber units after the time interval.

9. A method for communicating an information signal between at least two subscriber units, comprising the steps of:
   (a) transmitting the information signal with a first subscriber unit;
   (b) receiving the information signal in a substantially unimpeded manner for a time interval, with a second subscriber unit; at either of the subscriber units:
   (c) detecting expiration of a time interval;
   (d) gradually reducing intelligibility of transmitted information signals in response to step (c).

10. The method of claim 9, wherein step (c) further comprises detecting system communication traffic exceeding a threshold.

11. The method of claim 9, which includes the step of (e) further reducing intelligibility or quality of transmitted information after the detecting occurrence of a an event.

12. The method of claim 9, wherein step (e) comprises gradually reducing intelligibility or quality of transmitted information signal to a threshold level of intelligibility after expiration of the time interval.

13. The method of claim 11, wherein step (e) comprises gradually reducing intelligibility of transmitted information signal until the transmitted information signal becomes unintelligible after detecting occurrence of said event.

14. A method for communicating an information signal between at least two subscriber units, comprising the steps at either of the subscribers of:
   (a) receiving the information signal in a substantially unimpeded manner;
   (b) detecting occurrence of an event;
   (c) gradually reducing intelligibility or quality of received information signals during communication in response to step (b).

15. In a time division multiplex communication system having at least one communication channel apportioned into a plurality of time intervals, a method for communicating an information signal between at least two subscriber units, comprising the steps of:
   (a) transmitting the information signal during at least one time interval in a substantially unimpeded manner;
   (b) detecting occurrence of an event;
   (c) gradually reducing intelligibility or quality of the transmitted information signal during communication in response to step (b) to provide a reduced intelligibility or quality signal;
   (d) transmitting said reduced intelligibility or quality signal in a portion of said at least one time interval.

16. The method of claim 15, wherein step (d) comprises trasmitting said reduced intelligibility or quality signal in a portion of said time interval, while allocating remaining portions of said at least one time interval to another subscriber unit.

17. In a time division multiplex communication system having at least one communication channel apportioned into a plurality of time intervals, a method for communicating an information signal between at least two subscriber units, comprising the steps of:
   (a) processing the information signal in a coding means at a coding rate to provide a coded signal;
   (b) transmitting said coded signal during at least one time interval in a substantially unimpeded manner;
   (c) detecting occurrence of an event;
   (d) gradually reducing intelligibility or quality of the coded signal during communication in response to step (c) to provide a reduced intelligibility or quality coded signal;
   (e) transmitting said reduced intelligibility or quality coded signal in a portion of said at least one time interval.

18. The method of claim 17, wherein step (d) comprises reducing said coding rate.

19. The method of claim 17, wherein step (d) comprises modifying said coding means to alter coding procedures used therein.

20. The method of claim 19, wherein step (d) comprises adapting said coding means from sub-band coding to linear predictive coding.

21. In a communication system having a plurality of subscriber units constructed and arranged to communicate via at least one repeater, a method for communicating an information signal between at least two subscriber units, comprising the steps of:

at a subscriber unit:
(a) transmitting an information signal to a repeater unit; at said repeater unit:
(b) receiving said information signal from said subscriber unit;
(c) transmitting said information in a substantially unimpeded manner to another subscriber unit;
(d) determining occurrence of an event;
(e) gradually reducing intelligibility or quality of said information signal to provide a reduced intelligibility or quality signal during communication; and
(f) transmitting said reduced intelligibility or quality signal to said other subscriber unit.

22. An apparatus having a transmitter and receiver for communicating an information signal, comprising:
detecting means for detecting occurrence of an event; and
means responsive to said detecting means for gradually reducing intelligibility or quality of the information signal during communication after detection of said event.

23. An apparatus for communicating an information signal, comprising:
an information signal source for providing an information signal;
processing means for processing said information signal to provide a processed signal;
detecting means for detecting occurrence of an event;
means for adapting said processing means so as to gradually reduce intelligibility or quality of said processed signal during communication; and
means for transmitting said processed signal.

* * * * *